Jan. 1, 1935.   A. W. SODERBERG   1,986,685
SHEARS
Filed Aug. 8, 1933   3 Sheets-Sheet 1

Inventor:
ANDREW W. SODERBERG,
by Usina & Rauber
his Attorneys.

Jan. 1, 1935.   A. W. SODERBERG   1,986,685
SHEARS
Filed Aug. 8, 1933   3 Sheets-Sheet 2
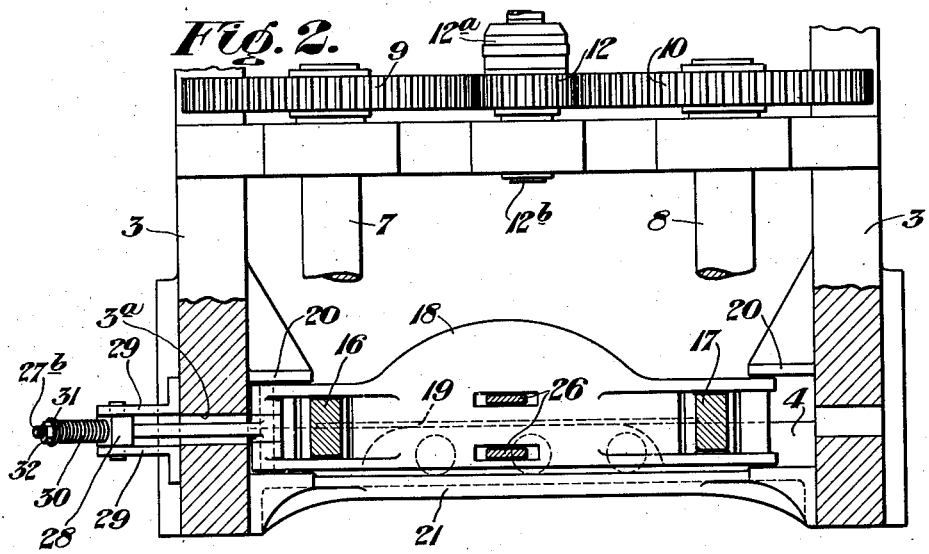
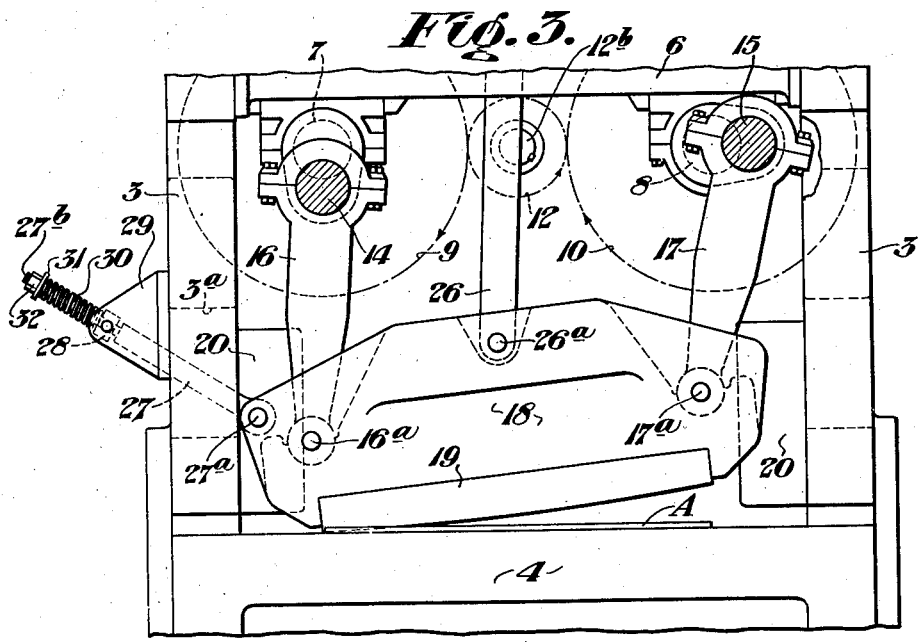
Inventor:
ANDREW W. SODERBERG,
by: Usina & Rauber
his Attorneys.

Inventor:
ANDREW W. SODERBERG,
by
his Attorneys.

Patented Jan. 1, 1935

1,986,685

UNITED STATES PATENT OFFICE 1,986,685

SHEARS

Andrew W. Soderberg, Munhall, Pa.

Application August 8, 1933, Serial No. 684,252

1 Claim. (Cl. 164—53)

This invention relates to improvements in shears, and more particularly to those devices used for the end and side shearing of metal plates and the like, although not limited thereto.

In the process of end shearing of metal plates the first cut removes the crop end. Whether the plate requires "cropping" only at each end or is sheared in multiple lengths, it becomes necessary to reshear one end of each plate, particularly if they are of substantial thickness, in order to remove the deformation on the end of the plate, which contacted under the top knife of the shear device. This deformation, or what is known in the mill as "shear bow", causes a loss of from approximately one inch to three inches in scrap for each cut and entails a great amount of labor in handling. It is also obvious to those skilled in the art that compensations must be made for this scrap loss in producing the various sizes required in the finished article. These conditions are also existent in side shearing operations.

The overlapping of the stationary knife and the movable knife in the conventional design of "gate" shear is unavoidable, although it is true that no shearing action takes place after the cooperating edges of the knives pass each other.

When shearing plates lengthwise in multiple widths in a side gate shear, it becomes necessary to make due allowance for reshearing one edge of each plate in order to remove the "bow", causing a loss of material and additional labor.

One object of the present invention is the provision of a novel apparatus for shearing metal plates in such manner as to completely eliminate the "bowing" of the sheared edge, resulting in a very substantial saving in "scrap loss" and the labor incident to its handling.

Another object is to provide novel means for producing a combined rolling or rocking motion to the movable knife in such manner as to obviate the necessity of its progressing beyond the cutting edge of the stationary knife.

A still further object is to provide a novel tension means to adjust the longitudinal travel of the movable shear blade and to return the same to a desired position at the end of each shearing cycle.

These and further objects will appear after referring to the drawings, in which:

Figure 2 is a fragmentary plan, partly in section.

Figures 3, 4 and 5 are fragmentary front elevations showing the elements of the apparatus in various stages of operation.

Figure 1:
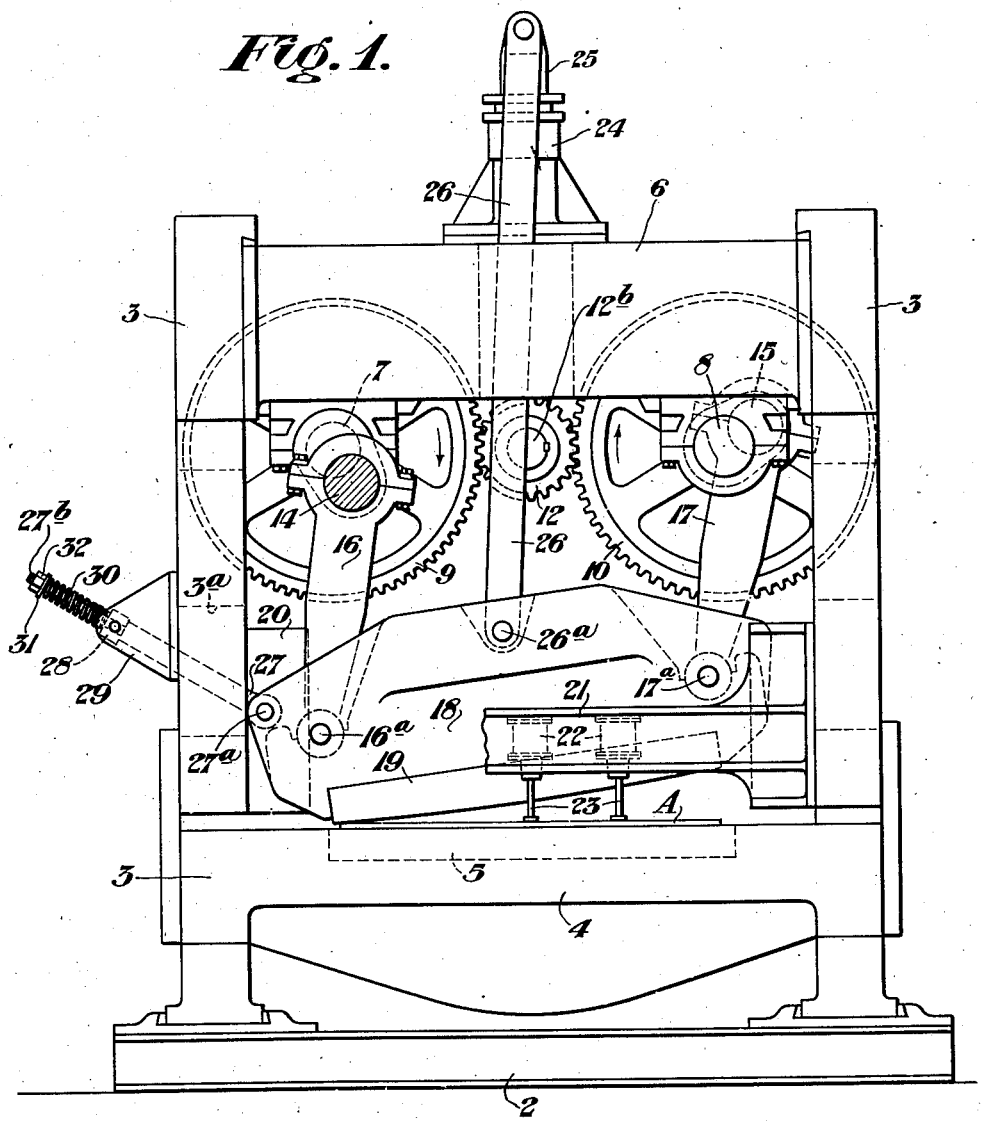
Figure 1 is a front elevation of the apparatus of the invention.

Referring more particularly to the drawings, the numeral 2 designates a bed plate on which there is mounted a housing 3 for the apparatus of the invention. The housing 3 carries a lower and stationary shear block 4, to which there is secured a conventional shear knife 5, and an upper cross-frame 6, in which there is journaled a pair of shafts 7 and 8.

The shafts 7 and 8 each have a gear secured thereto, as at 9 and 10, respectively, which is rotated by a common pinion 12. The pinion 12 is provided with a clutch device, generally indicated at 12$^a$, from which it receives rotation through a shaft 12$^b$, that may be driven in any suitable manner.

The shafts 7 and 8 carry cranks 14 and 15, respectively, which are disposed directly over the lower shear block 4. The crank 14, which is given an approximate "lead" or offset of 90 degrees with respect to the crank 15, has a pitman 16 connected thereto. A similar pitman 17 is connected to the crank 15.

An upper and movable shear block 18 is supported by the pitmen 16 and 17, as at 16$^a$ and 17$^a$, respectively, and has secured thereto a shear knife 19 of curved shape, representing preferably a true radius. The upper shear blade 19 is guided at the rear by lugs 20 extending from the housing 3, and at the front by a cross-frame 21 which serves, in addition, as a support for a plurality of fluid operated cylinders 22, having associated therewith the usual shear hold-downs 23. A suitable source of fluid supply serves to actuate the hold-downs.

A fluid cylinder 24 is mounted on the upper cross-frame 6, and provided with a piston having a rod 25 to which there is connected one of the ends of a pair of links 26. The other ends of the links 26 are secured as at 26$^a$ to the upper mid-portion of the upper shear block 18. A suitable source of fluid supply is connected to the fluid cylinder 24, and is controlled in such manner as to balance the upper shear block through the links 26.

A guide rod 27 is connected at one of its ends 27$^a$ to one corner of the upper shear block 18 and made to extend through an aperture 3$^a$ in the housing 3, and a swivel cross-head 28 which is mounted in an ear 29. The end of the guide rod 27, which extends through and beyond the ear 29, is threaded as at 27$^b$ and provided with a spring 30, washer 31, and nut 32, for tensioning the guide rod against movement through the swivel cross-head 28.

In operation, a plate, or the like, which is represented at A, is positioned beneath the hold-downs 23 and the fluid cylinders 22 operated to hold it in position between the shear knives 5 and 19. The gears 9 and 10 are made to rotate by means of the common pinion 12 and the clutch 12ª on the driven shaft 12ᵇ.

The rotation of the gear 9 will cause the crank 14 to move downwardly ahead of the crank 15, due to the fact that it has a 90 degree "lead" or offset. This will cause the curved knife 19 to begin its cutting action at the edge of the plate A. The position of the various elements of the apparatus at this stage of the operation is shown in Figure 1.

Figure 4:
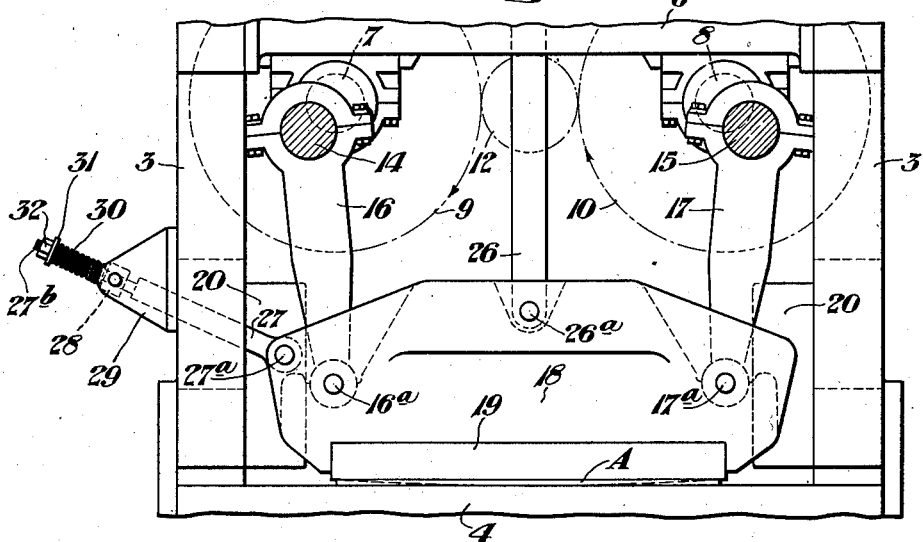

The knife 19 will be lowered until the lower "dead-center" of the pitman 16 is reached, at which time it will have cooperated with the stationary knife 5 in such manner as to have penetrated the plate for a short distance inwardly from its edge, as shown in Figure 3. During this stage of the operation the crank 15 will have caused the pitman 17 to have begun its descent. The lower dead-center of the crank 14 will not permit the pitman 16 to cause the knife 19 to overlap the upper edge of the stationary knife 5, as shown in Figure 3. As the pitman 17 continues its descent, the pitman 16 will move vertically a very slight distance until the former is in a corresponding position, at which time the mid-portion of the curved knife 19 will penetrate the plate A, as shown in Figure 4.

Figure 5:
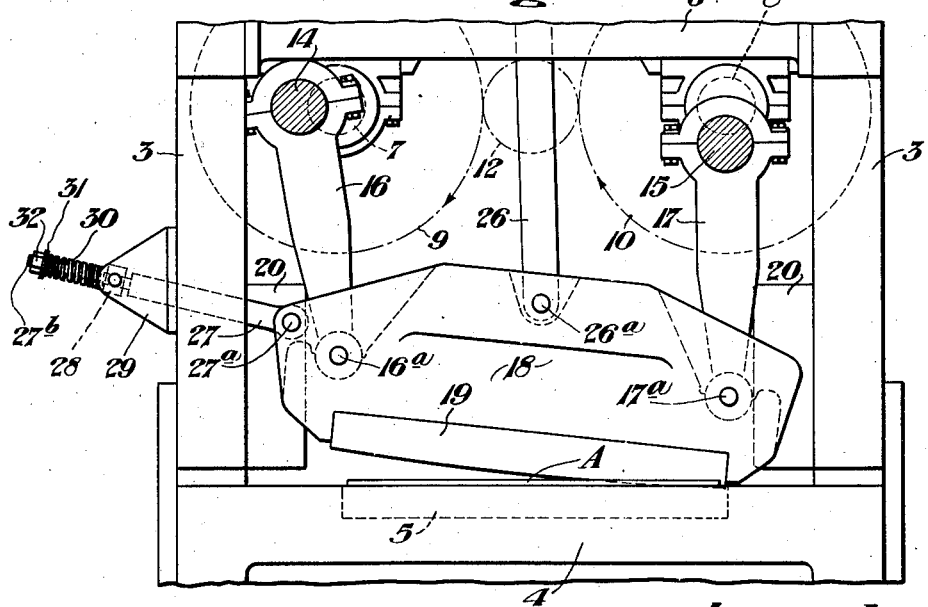

The pitman 16 will next rise fairly rapidly, while the end of the knife 19 which is adjacent the descending pitman 17 will rock across the unsheared width of the plate and complete the shearing operation, as illustrated in Figure 5.

Due to the rocking action of the curved knife 19 and the fact that it does not overlap the stationary and cooperating knife 5, the plate A will be completely sheared with its severed edges occupying a plane.

While I have shown and described one specific embodiment of my invention, it will be understood that I do not wish to be limited exactly thereto, since various modifications may be made without departing from the scope of my invention, as defined in the following claim.

I claim:

A heavy duty shear for shearing metal plates of substantial thickness comprising a housing, a stationary shear knife mounted on said housing, a pair of shafts journaled on said housing, a crank on one of said shafts, a crank on the other of said shafts being offset approximately 90 degrees with respect to said first named crank, a pair of pitmen, each of which is connected at one of its ends to one of said cranks and at the other of its ends to a movable shear member, a curved knife mounted on said movable shear member, means for periodically rotating said pair of shafts, fluid means for balancing said movable shear member, and tension means for limiting the longitudinal movement of said movable shear member, said cranks and pitmen being constructed and arranged to move said movable shear member and its curved knife in a path to effect a rolling cut in conjunction with said stationary shear knife and to limit the vertical movement of said shear member and prevent said curved knife overlapping the cutting edge of said stationary shear knife.

ANDREW W. SODERBERG.